Aug. 24, 1926.
W. KELLER
SHOCK ABSORBER
Filed July 13, 1925
1,597,074
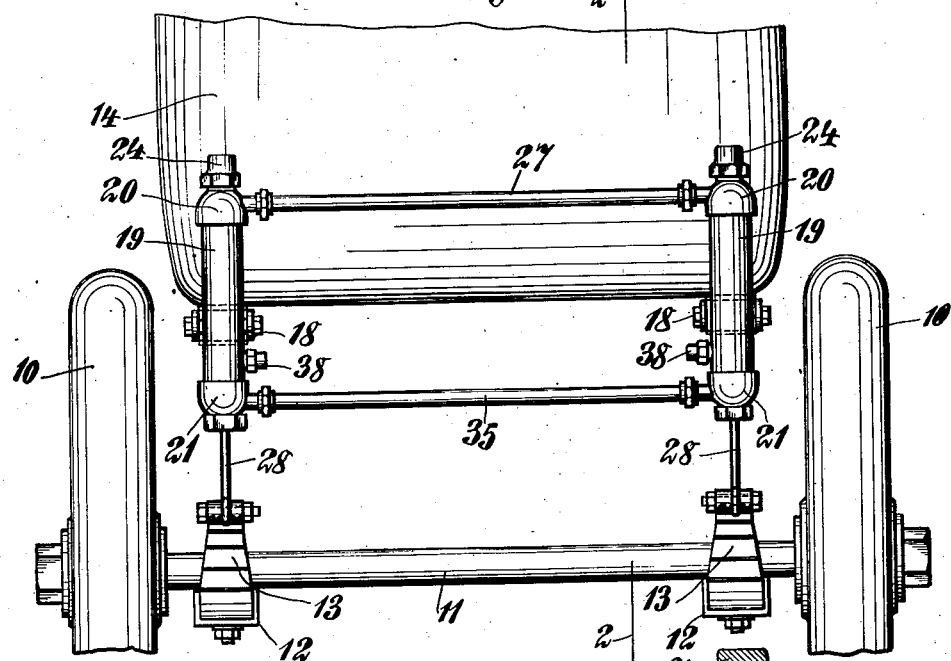
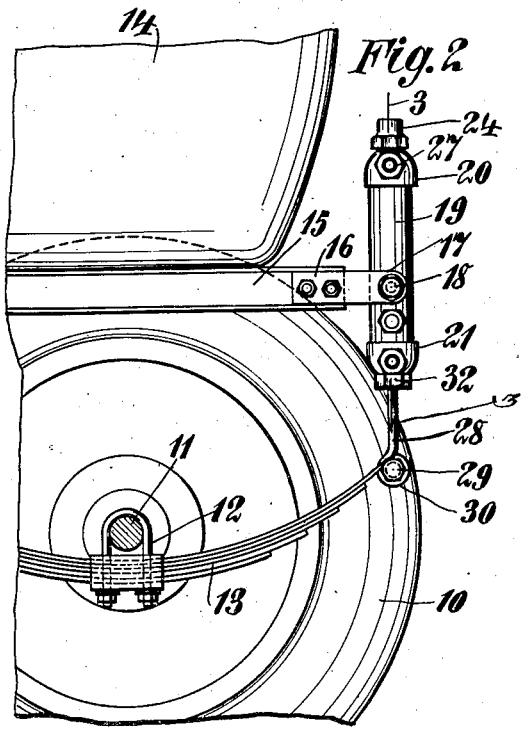
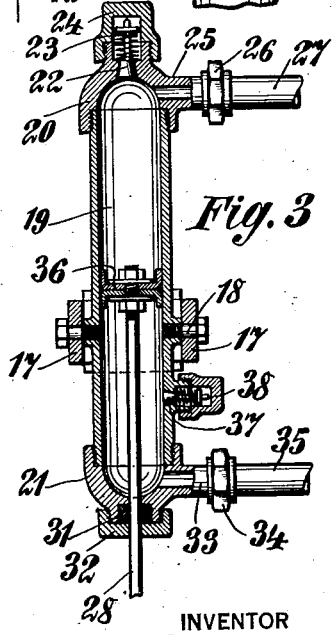
INVENTOR
W. Keller.
BY
ATTORNEY Patented Aug. 24, 1926.

1,597,074

UNITED STATES PATENT OFFICE.

WILLIAM KELLER, OF HANCOCK, MICHIGAN.

SHOCK ABSORBER.

Application filed July 13, 1925. Serial No. 43,091.

This invention relates to shock absorbing devices as applied to vehicles and has as one of its objects to provide means for automatically preventing excessive bounding of the body or reaction thereof as transmitted from the springs.

A further object is to interpose a pneumatic cushion between the springs and chassis frame to equalize the effects of the springs uniformly on each side of the vehicle, tending to maintain the body level.

Another object is to provide relief valves manually operated to admit air whereby a constant supply is maintained to operate the device.

These and other like objects are secured by the novel construction and arrangement of parts hereinafter described and shown in the accompanying drawing, forming an essential part of this disclosure, and in which:—

Figure 1 is a partial rear end elevational view of a conventional type of vehicle, showing an embodiment of the invention as applied.

Figure 2 is a sectional view of the same, the section being taken on line 2—2 of Figure 1.

Figure 3 is an enlarged longitudinal sectional view taken on line 3—3 of Figure 2.

Referring more in detail to the drawing, the numeral 10 designates the rear wheels mounted on an axle 11 having stirrups 12 carrying leaf springs 13.

A body 14 rests upon a chassis having longitudinal side beams 15 supported by the springs in the manner now to be described.

Bolted to the ends of the beams 15 are extensions 16 terminating in forks 17 through which pass pivot screws 18 threaded into bosses formed on opposite sides of cylinders 19 arranged substantially vertical and provided with caps 20 and 21 respectively at their upper and lower ends.

The cap 20 contains an inlet valve 22 normally closed by a spring 23 and is provided with a removable cover 24 permitting access to the valve when air is allowed in or out of the cylinders 19.

Extending laterally outward from the cap is a hollow projection 25 engaged by a union connector 26 with a pipe 27 leading to the opposite side of the vehicle which is provided with similar but oppositely disposed elements.

The lower cap 21 is furnished with a central opening through which passes a rod 28 connected by a pin 29 to an eye 30 in the end of a leaf spring 13.

A packing ring 31 is fitted in a recess in the end of the cap 21, the same being held in place around the rod 28 by a nut 32.

A hollow projection 33, similar to the corresponding element 25, is provided with a union 34 to connect the pipe 35, communicating with the cylinder at the opposite side of the vehicle.

Pistons 36, fixed on the rods 28 operate in the cylinders 19, snugly fitting the same and compressing the air in their upper ends to the extent of supporting the weight of the vehicle, the weight being equally distributed on each side, and as the cylinders are in communication, this is readily accomplished.

In order to prevent rebound, air is admitted to the cylinders below the pistons by the inlet valves 37, the same being normally spring pressed to their seats and provided with covers 38, removable when air under compression is entered.

From the foregoing description the operation will be understood and the advantages of its use be obvious.

Having thus described my invention and set forth the manner of its construction and application, what I claim as new and desire to secure by Letters Patent, is:—

1. A shock absorbing device for vehicles comprising in combination with the springs and chassis frame thereof, of a pair of cylinders having caps at their ends, forked supports pivotally engaging said cylinders, said supports being fixed on the ends of the chassis side members, pistons close fitting said cylinders, rods fixed in said pistons, the lower ends of said rods being pivotally engaged with the ends of said springs, and pipes communicating between the pairs of cylinders respectively above and below said pistons.

2. A shock absorbing device for vehicles comprising in combination with the springs and chassis frame thereof, of a pair of cylinders having caps at their ends, forked supports pivotally engaging said cylinders, said supports being fixed on the ends of the chassis side members, pistons close fitting said cylinders, rods fixed in said pistons, the lower ends of said rods being pivotally engaged with the ends of said springs, means for admitting air to said cylinders above and below said pistons, and means of communication between said cylinders at their respective ends.

In witness whereof I have affixed my signature.

WILLIAM KELLER.